(12) United States Patent
Zwaan et al.

(10) Patent No.: US 11,554,879 B2
(45) Date of Patent: *Jan. 17, 2023

(54) UAV PAYLOAD MODULE CAMERA ASSEMBLY AND RETRACTION MECHANISM

(71) Applicant: AeroVironment, Inc., Simi Valley, CA (US)

(72) Inventors: John Peter Zwaan, Simi Valley, CA (US); Pavel Belik, Simi Valley, CA (US); Manolis Dimotakis, Simi Valley, CA (US); Christopher J. D'Aquila, Burbank, CA (US)

(73) Assignee: AeroVironment, Inc., Arlington, VA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/060,071

(22) Filed: Sep. 30, 2020

(65) Prior Publication Data

US 2021/0016896 A1 Jan. 21, 2021

Related U.S. Application Data

(63) Continuation of application No. 16/666,386, filed on Oct. 28, 2019, now Pat. No. 10,800,544, which is a
(Continued)

(51) Int. Cl.
*B64D 47/08* (2006.01)
*B64C 39/02* (2006.01)
(Continued)

(52) U.S. Cl.
CPC ............ *B64D 47/08* (2013.01); *B64C 39/024* (2013.01); *B64D 9/00* (2013.01); *B64C 2201/127* (2013.01); *B64D 27/24* (2013.01)

(58) Field of Classification Search
CPC .......... B64D 47/08; B64D 9/00; B64D 27/24; B64C 39/024; B64C 2201/127
See application file for complete search history.

(56) References Cited

U.S. PATENT DOCUMENTS 1,595,194 A * 8/1926 Hotchkin ................ F21S 8/028
362/145
2,487,405 A 11/1949 Andrews
(Continued)

FOREIGN PATENT DOCUMENTS

CN 2158170 Y 3/1994
CN 1197433 A 10/1998
(Continued)

OTHER PUBLICATIONS

International Searching Authority/US; International Search Report (ISR) for corresponding PCT case application No. PCT/US2011/042376 entitled UAV Payload Module Camera Assembly and Retraction Mechanism by Zwaan et al.; dated Dec. 2, 2011 from US International Searching Authority; 2 pgs.
(Continued)

*Primary Examiner* — Justin M Benedik
(74) *Attorney, Agent, or Firm* — Christopher R. Balzan, Esq.; Eric J. Aagaard, Esq.

(57) ABSTRACT

In one possible embodiment, a UAV payload module retraction mechanism is provided including a payload pivotally attached to a housing. A biasing member is mounted to bias the payload out of the housing and a winch is attached to the payload. An elongated flexible drawing member is coupled between the housing and the winch, the elongated drawing flexible member being capable of being drawn by the winch to retract the payload within the housing.

10 Claims, 7 Drawing Sheets

Related U.S. Application Data continuation of application No. 16/130,997, filed on Sep. 13, 2018, now Pat. No. 10,457,418, which is a continuation of application No. 15/829,214, filed on Dec. 1, 2017, now Pat. No. 10,189,581, which is a continuation of application No. 15/007,206, filed on Jan. 26, 2016, now Pat. No. 9,850,004, which is a continuation of application No. 13/730,828, filed on Dec. 29, 2012, now Pat. No. 9,309,006, which is a continuation of application No. PCT/US2011/042376, filed on Jun. 29, 2011.

(60) Provisional application No. 61/359,809, filed on Jun. 29, 2010, provisional application No. 61/359,817, filed on Jun. 29, 2010.

(51) Int. Cl.
*B64D 9/00* (2006.01)
*B64D 27/24* (2006.01)

(56) References Cited

U.S. PATENT DOCUMENTS

| | | | |
|---|---|---|---|
| 2,778,611 A | | 1/1957 | Cotton |
| 3,569,691 A | * | 3/1971 | Tracy .................. F21S 8/028 |
| | | | 362/233 |
| 4,114,839 A | | 9/1978 | Sibley et al. |
| 4,593,288 A | | 6/1986 | Fitzpatrick |
| 4,884,766 A | * | 12/1989 | Steinmetz .............. F42B 10/20 |
| | | | 244/3.27 |
| 5,107,287 A | | 4/1992 | Swayze |
| 5,311,411 A | | 5/1994 | Garolfi |
| 5,603,505 A | | 2/1997 | Acock |
| 5,627,616 A | | 5/1997 | Seargent et al. |
| 5,927,646 A | | 7/1999 | Sandy |
| 6,056,237 A | | 5/2000 | Woodland |
| 6,652,164 B2 | | 11/2003 | Stiepel et al. |
| 6,918,680 B2 | | 7/2005 | Seeberger |
| 7,210,654 B1 | | 5/2007 | Cox et al. |
| 7,775,695 B1 | * | 8/2010 | Rose .................. B60Q 1/0483 |
| | | | 362/493 |
| 8,000,588 B1 | | 8/2011 | Harvey |
| 8,074,930 B2 | | 12/2011 | Sibley |
| 8,118,259 B2 | | 2/2012 | Guering |
| 9,309,006 B2 | | 4/2016 | Zwaan et al. |
| 9,850,004 B2 | | 12/2017 | Zwaan et al. |
| 10,189,581 B2 | | 1/2019 | Zwaan et al. |
| 10,457,418 B2 | | 10/2019 | Zwaan et al. |
| 10,800,544 B2 | | 10/2020 | Zwaan et al. |
| 2004/0065246 A1 | | 4/2004 | Allen |
| 2004/0200930 A1 | * | 10/2004 | Bays-Muchmore .... B64C 25/00 |
| | | | 244/109 |
| 2005/0029399 A1 | | 2/2005 | Lowe et al. |
| 2005/0103930 A1 | * | 5/2005 | Silansky ............ H04B 7/18504 |
| | | | 244/30 |
| 2005/0175333 A1 | | 8/2005 | Yamada |
| 2005/0230527 A1 | | 10/2005 | Silansky et al. |
| 2005/0276056 A1 | | 12/2005 | Tiesler |
| 2006/0108477 A1 | | 5/2006 | Helou, Jr. |
| 2007/0253790 A1 | | 11/2007 | Boggenstall et al. |
| 2008/0267612 A1 | | 10/2008 | Harvey |
| 2009/0189015 A1 | | 7/2009 | Alavi |

FOREIGN PATENT DOCUMENTS

| | | |
|---|---|---|
| CN | 1429161 A | 7/2003 |
| CN | 101010236 A | 8/2007 |
| CN | 100492100 C | 5/2009 |
| CN | 101443231 A | 5/2009 |
| CN | 101489867 A | 7/2009 |
| CN | 101522519 A | 9/2009 |
| DE | 29721885 U1 | 6/1998 |
| EP | 0980828 A1 | 2/2000 |
| RU | 2068799 C1 | 11/1996 |
| WO | 2008119144 A2 | 10/2008 |

OTHER PUBLICATIONS

International Searching Authority/US; Written Opinion of the International Searching Authority (WO) and Search History for corresponding PCT/US2011/042376 entitled UAV Payload Module Camera Assembly and Retraction Mechanism by Zwaan et al.; dated Dec. 2, 2011 from US International Searching Authority; 8 pgs.

Intellectual Property Office of Singapore (IPOS); Written Opinion (WO) and Singapore Search Report (SG_Search_Rpt) for corresponding Singapore case application No. 201302130-8, entitled UAV payload module camera assembly and retraction mechanism by Zwaan et al., dated Apr. 11, 2014 from Danish Patent and Trademark Office, 18 pgs.

Intellectual Property Office of Singapore (IPOS); Examination Report (Exam_Rpt) for corresponding Singapore case application No. 201302130-8, entitled UAV payload module camera assembly and retraction mechanism by Zwaan et al., dated Nov. 3, 2014 from Danish Patent and Trademark Office, 14 pgs.

The State Intellectual Property Office of the People's Republic of China (SIPO); Search Report (SIPO1_Search_Rpt) for corresponding Chinese case application No. 201180035269.8, entitled UAV payload module camera assembly and retraction mechanism by Zwaan et al., dated Sep. 3, 2014 from The State Intellectual Property Office of the People's Republic of China, 2 pgs.

The State Intellectual Property Office of the People's Republic of China (SIPO); First Office Action (SIPO_1OA) for corresponding Chinese case application No. 201180035269.8, entitled UAV payload module camera assembly and retraction mechanism by Zwaan et al., dated Sep. 12, 2014 from The State Intellectual Property Office of the People's Republic of China, 6 pgs.

Australian Government IP Australia (AUIP); Examination Report (Exam_Rpt) for corresponding Australian case application No. 2011276454, entitled UAV payload module camera assembly and retraction mechanism by Zwaan et al., dated Dec. 12, 2014 from Australian Government IP Australia; 3 pgs.

The State Intellectual Property Office of the People's Republic of China (SIPO); Second Office Action (SIPO_2OA) for corresponding Chinese case application No. 201180035269.8, entitled UAV payload module camera assembly and retraction mechanism by Zwaan et al., dated Jul. 16, 2015 from The State Intellectual Property Office of the People's Republic of China, 6 pgs.

The State Intellectual Property Office of the People's Republic of China (SIPO); Search Report (SIPO2_Search_Rpt) for corresponding Chinese case application No. 201180035269.8, entitled UAV payload module camera assembly and retraction mechanism by Zwaan et al., dated Jul. 7, 2015 from The State Intellectual Property Office of the People's Republic of China, 2 pgs.

The State Intellectual Property Office of the People's Republic of China (SIPO); Third Office Action (SIPO_3OA) for corresponding Chinese case application No. 201180035269.8, entitled UAV payload module camera assembly and retraction mechanism by Zwaan et al., dated Mar. 31, 2016 from The State Intellectual Property Office of the People's Republic of China, 7 pgs.

Taiwan Intellectual Property Office (TIPO); Search Report (Search_Rpt) for corresponding Taiwan case patent application No. 100122918, entitled UAV payload module camera assembly and retraction mechanism by Zwaan et al., dated Mar. 4, 2016 from Taiwan Intellectual Property Office, 1 pg.

Taiwan Intellectual Property Office (TIPO); First Office Action (TIPO_1OA) for corresponding Taiwan case patent application No. 100122918, entitled UAV payload module camera assembly and retraction mechanism by Zwaan et al., dated Jun. 7, 2016 from Taiwan Intellectual Property Office, 6 pgs.

The State Intellectual Property Office of the People's Republic of China (SIPO); Decision of Rejection (Dec_Rejection) for corresponding Chinese case application No. 201180035269.8, entitled UAV payload module camera assembly and retraction mechanism

(56) References Cited

OTHER PUBLICATIONS by Zwaan et al., dated Oct. 18, 2016 from The State Intellectual Property Office of the People's Republic of China, 9 pgs.
European Patent Office (EPO); extended European Search Report (eESR) in English for corresponding EPC patent application No. 11 804 183.9, entitled UAV payload module camera assembly and retraction mechanism by Zwaan et al., dated Jul. 11, 2017 from European Patent Office, 6 pgs.
Canadian Intellectual Property Office (CIPO); First Office Action (1OA) and Search Report (Search_Rpt) for corresponding Canadian patent application No. 2,840,582 entitled UAV payload module camera assembly and retraction mechanism by Zwaan et al., dated Jun. 29, 2017 from Canadian Intellectual Property Office, 3 pgs.
Korean Intellectual Property Office (KIPO); First Office Action (1OA) for corresponding Korea case patent application No. 10-2013-7002314, entitled UAV payload module camera assembly and retraction mechanism by Zwaan et al., dated Sep. 1, 2017 from Korean Intellectual Property Office, 8 pgs.
Australian Government IP Australia; (AUIP) Examination Report (Exam_Rpt) for corresponding Australian divisional case application No. 2016228152, entitled UAV payload module camera assembly and retraction mechanism by Zwaan et al., dated Nov. 9, 2017 from Australian Government IP Australia; 3 pgs.
Korean Intellectual Property Office (KIPO); First Office Action (1OA) for corresponding Korea divisional case patent application No. 10-2018-7018541, entitled UAV payload module camera assembly and retraction mechanism by Zwaan et al., dated Sep. 17, 2018 from Korean Intellectual Property Office, 3 pgs.
Canadian Intellectual Property Office (CIPO); First Office Action (2OA) and Search Report (Search_Rpt) for corresponding Canadian patent application No. 2,840,582 entitled UAV payload module camera assembly and retraction mechanism by Zwaan et al., dated Sep. 21, 2018 from Canadian Intellectual Property Office, 3 pgs.
Taiwan Intellectual Property Office (TIPO); First Office Action (TIPO_1OA) for corresponding Taiwan case patent application No. 107123474, entitled UAV payload module camera assembly and retraction mechanism by Zwaan et al., dated Apr. 8, 2019 from Taiwan Intellectual Property Office, 3 pgs.
Taiwan Intellectual Property Office (TIPO); Search Report (Search_Rpt) for corresponding Taiwan case patent application No. 107123474, entitled UAV payload module camera assembly and retraction mechanism by Zwaan et al., dated Apr. 3, 2019 from Taiwan Intellectual Property Office, 1 pg.
Intellectual Property India (IPI); First Examination Report (FER) for corresponding Indian case patent application No. 236/KOLNP/2013, entitled UAV payload module camera assembly and retraction mechanism by Zwaan et al., dated Apr. 22, 2019 from Intellectual Property India, 6 pgs.
Korean Intellectual Property Office (KIPO); Examination Report (Exam_Rpt) for corresponding Korean case application No. 10-2019-7017055, entitled UAV payload module camera assembly and retraction mechanism by Zwaan et al., dated Oct. 1, 2019 from Intellectual Property Korea, 2pgs.
Canadian Intellectual Property Office (CIPO); First Office Action (1OA) and Search Report (Search_Rpt) for corresponding Canadian patent application No. 3,025,550 entitled UAV payload module camera assembly and retraction mechanism by Zwaan et al., dated Nov. 13, 2019 from Canadian Intellectual Property Office, 4 pgs.
European Patent Office (EPO); extended European Search Report (eESR) in English for corresponding EPC patent application No. 19 186 725.8, entitled UAV payload module camera assembly and retraction mechanism by Zwaan et al., dated Nov. 20, 2019 from European Patent Office, 6 pgs.
Australian Government IP Australia (AUIP); Examination Report (Exam_Rpt) for corresponding Australian case application No. 2018263983, entitled UAV payload module camera assembly and retraction mechanism by Zwaan et al., dated Oct. 25, 2019 from Australian Government IP Australia; 3 pgs.
Taiwan Intellectual Property Office (TIPO); Non-Final Office Action (NFOA) for corresponding Taiwan case application No. 108139933, entitled UAV payload module camera assembly and retraction mechanism by Zwaan et al., dated May 13, 2020 from Taiwan Intellectual Property Office; 3 pgs.
Taiwan Intellectual Property Office (TIPO); Search Report (Search_Rpt) for corresponding Taiwan case application No. 108139933, entitled UAV payload module camera assembly and retraction mechanism by Zwaan et al., dated May 13, 2020 from Taiwan Intellectual Property Office; 1 pg.
The National Intellectual Property Adminstration of the People's Republic of China (CNIPA); First Office Action (1OA) for corresponding Chinese case application No. 201810016477.7, entitled UAV payload module camera assembly and retraction mechanism by Zwaan et al., dated Dec. 25, 2020 from the National Intellectual Property Administration of the People's Republic of China; 5 pgs.
The National Intellectual Property Adminstration of the People's Republic of China (CNIPA); Search Report for corresponding Chinese case application No. 201810016477.7, entitled UAV payload module camera assembly and retraction mechanism by Zwaan et al., dated Dec. 18, 2020 from the National Intellectual Property Administration of the People's Republic of China; 2 pgs.
European Patent Office (EPO); Article 94(3) EPC Communication for corresponding EPC patent application No.: 19186725.8; entitled UAV payload module camera assembly and retraction mechanism by Zwaan et al.; dated May 28, 2021 from the European Patent Office; 5 pages.
Australian Government IP Australia (AUIP); Examination Report (Exam_Rpt) for corresponding Australian divisional case application No. 2020210247; entitled UAV payload module camera assembly and retraction mechanism by Zwaan et al.; dated Sep. 10, 2021 from Australian Government IP Australia; 3 pgs.
The National Intellectual Property Administration of the People's Republic of China (CNIPA); English translation of Second Office Action (2OA) for corresponding Chinese case application No. 201810016477.7; entitled UAV payload module camera assembly and retraction mechanism by Zwaan et al.; dated Sep. 24, 2021 from the National Intellectual Property Administration of the People's Republic of China; 7 pages.
The National Intellectual Property Administration of the People's Republic of China (CNIPA); English translation of Third Office Action (OA3) for corresponding Chinese case application No. 201810016477.7; entitled UAV payload module camera assembly and retraction mechanism by Zwaan et al.; dated Apr. 1, 2022 from the National Intellectual Property Administration of the People's Republic of China; 4 pages.
Taiwan Intellectual Property Office (TIPO); English translation of Search Report (Search_Rpt) for corresponding Taiwan case application No. 110124774; entitled UAV payload module camera assembly and retraction mechanism by Zwaan et al.; dated Mar. 8, 2022 from the Taiwan Intellectual Property Office; 1 pg.

* cited by examiner

UAV PAYLOAD MODULE CAMERA ASSEMBLY AND RETRACTION MECHANISM

CROSS REFERENCE TO RELATED APPLICATIONS

This application is a continuation of U.S. patent application Ser. No. 16/666,386, filed Oct. 28, 2019, by Zwaan et al., entitled UAV PAYLOAD MODULE CAMERA ASSEMBLY AND RETRACTION MECHANISM herein incorporated by reference in its entirety, which is a continuation of U.S. patent application Ser. No. 16/130,997, filed Sep. 13, 2018, by Zwaan et al., entitled UAV PAYLOAD MODULE CAMERA ASSEMBLY AND RETRACTION MECHANISM herein incorporated by reference in its entirety, which is a continuation of U.S. patent application Ser. No. 15/829,214, filed Dec. 1, 2017, by Zwaan et al., now U.S. Pat. No. 10,189,581, issued Jan. 29, 2019, entitled UAV PAYLOAD MODULE CAMERA ASSEMBLY AND RETRACTION MECHANISM herein incorporated by reference in its entirety, which is a continuation of U.S. patent application Ser. No. 15/007,206, filed Jan. 26, 2016, by Zwaan et al., now U.S. Pat. No. 9,850,004, Issued Dec. 26, 2017, entitled UAV PAYLOAD MODULE CAMERA ASSEMBLY AND RETRACTION MECHANISM herein incorporated by reference in its entirety, which is a continuation of U.S. patent application Ser. No. 13/730,828, filed Dec. 29, 2012, by Zwaan et al., now U.S. Pat. No. 9,309,006, Issued Apr. 12, 2016 entitled UAV PAYLOAD MODULE CAMERA ASSEMBLY AND RETRACTION MECHANISM herein incorporated by reference in its entirety, which is a continuation of PCT Application number PCT/US2011/042376, by Zwaan et al., entitled UAV PAYLOAD MODULE CAMERA ASSEMBLY AND RETRACTION MECHANISM, filed 29 Jun. 2011, herein incorporated by reference in its entirety, which claims the benefit of the following U.S. Provisional Applications, which are both herein incorporated by reference in their entireties:

U.S. Provisional Application No. 61/359,817 filed on 29 Jun. 2010, by Belik, et al., entitled UAV PAYLOAD MODULE CAMERA ASSEMBLY AND RETRACTION MECHANISM; and U.S. Provisional Application No. 61/359,809 filed on 29 Jun. 2010, by Belik, et al., entitled UAV HAVING HERMETICALLY SEALED MODULARIZED COMPARTMENTS AND FLUID DRAIN PORTS.

BACKGROUND

Reducing weight and size are paramount in the design of small unmanned vehicles. Small unmanned aerial vehicles or UAVs typically are designed to be launched from, and land on dry land. Such vehicles are now being sought that can operate while being exposed to, or after being exposed to aquatic environments. For example, it may be preferred to land an unmanned aerial vehicle on water, rather than on land, either to lessen the impact of landing, or because it is more easily retrievable location. Typically, amphibious aircraft, both manned and unmanned, are able to take off and land in water.

Hand launched amphibious UAVs though are not required to take off from the water, but are required to land on dry land, or on water. Some hand launced UAVs are designed to land by skidding along, or impacting the ground, which is considerably more abrupt than water landings.

What is needed is an amphibious UAV that can withstand high impact ground landings.

SUMMARY

In one possible embodiment, a UAV payload module retraction mechanism is provided including a payload pivotally attached to a housing. A biasing member is mounted to bias the payload out of the housing and a winch is attached to the payload. An elongated flexible drawing member is coupled between the housing and the winch, the elongated drawing flexible member being capable of being drawn by the winch to retract the payload within the housing.

In various embodiments, the payload is pivotally attached to a forward position in the housing, such as by a hinge. In various embodiments, the hinge is located forward of the payload when the payload is in a stowed position. In some embodiments, the hinge may include a pivot shaft, with the biasing member including a spring disposed about the pivot shaft. In various embodiments, the biasing member urges the payload into a deployed position.

In various embodiments, the payload includes a camera assembly which includes a camera and a pan tray, the pan tray being pivotally attached to the housing via a hinge, the pan tray having the winch and pan actuator. In some embodiments, the pan actuator is located between the hinge and the winch.

In various embodiments, the elongated flexible drawing member may be a cable, belt, or other drawing means.

In one possible embodiment, a UAV payload module retraction mechanism is provided having a payload module having a housing with an opening in a bottom wall of the housing. A payload is pivotally attached in a forward position within the housing. A biasing member is mounted to bias the payload out of the housing. A winch is mounted to the payload and a flexible cable is coupled between the housing and the winch for retracting the payload into and releasing the payload from the housing.

In various embodiments, the payload may include a camera assembly situated to pivot out of the housing through the opening in the bottom wall. In some embodiments, the flexible cable is a belt. The biasing member may urge the payload to a deployed position and may include a spring. In various embodiments, the payload is pivotally attached to a forward wall of the housing via a hinge. In some embodiments, the hinge may include a pivot shaft, and the biasing member include a spring disposed about the pivot shaft.

In various embodiments, the payload further includes a camera assembly having a pan tray mounted therewith, the pan tray being pivotally attached to the housing via a hinge, the pan tray including the winch and pan actuator, with pan actuator being located between the hinge and the winch.

BRIEF DESCRIPTION OF THE DRAWINGS

The features and advantages of the present invention will be better understood with regard to the following description, appended claims, and accompanying drawings where:

DESCRIPTION

Amphibious Unmanned Aerial Vehicle

Figure 1:
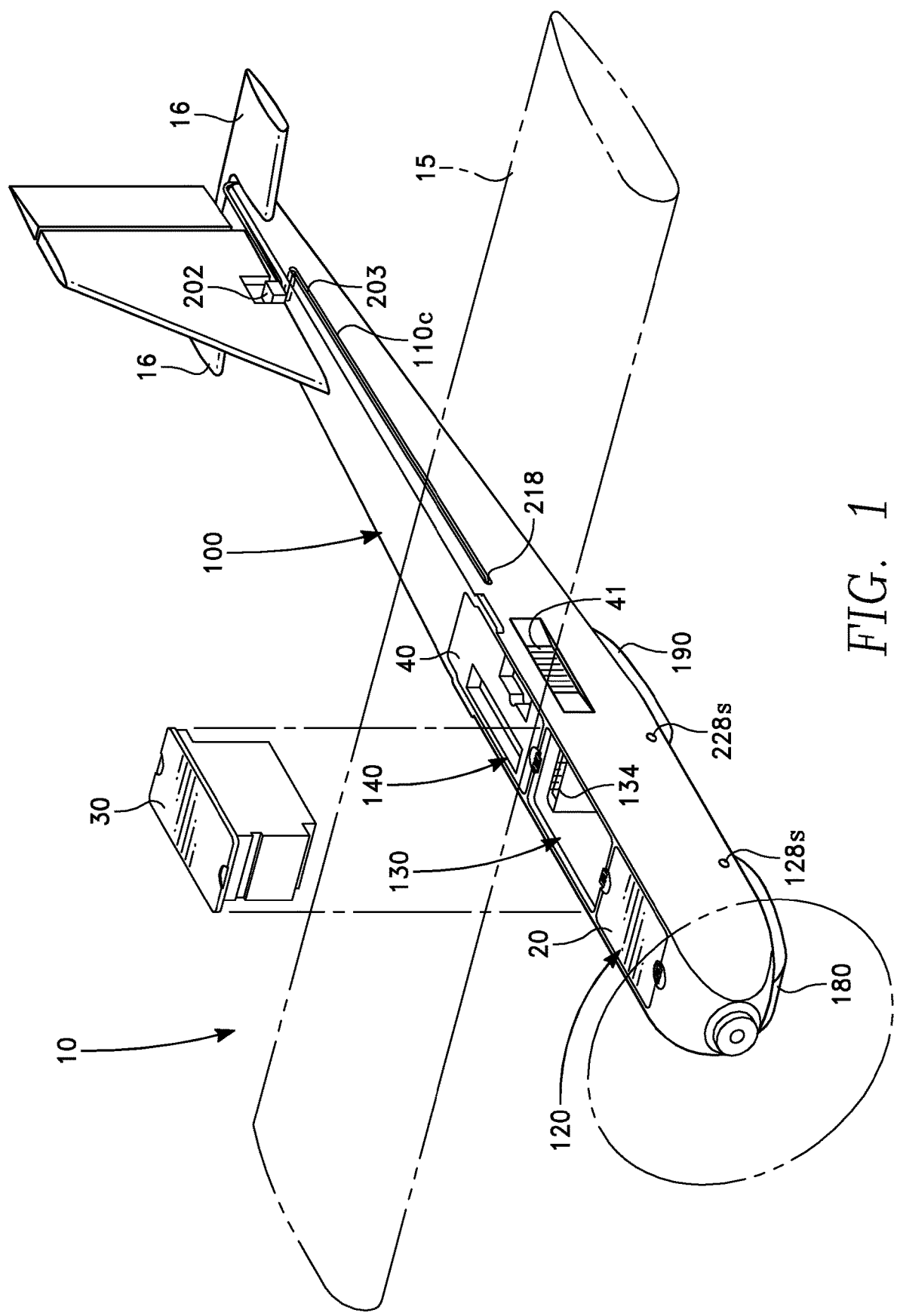
FIG. 1 shows a simplified perspective view of an amphibious unmanned aerial vehicle.

FIG. 1 shows a simplified perspective view of an amphibious unmanned aerial vehicle or UAV 10. The UAV 10 has a fuselage 100 of the amphibious unmanned aerial vehicle 10 has modularized compartments 120, 130, and 140 to contain modular components or modules, such as a battery module 20, a payload module 30, and avionics electronics module 40. In various embodiments, the wings 15 and/or 16 may be constructed of multiple pieces, which may separate, and/or "break away" or separate from the fuselage 100 during landings.

Figure 2:
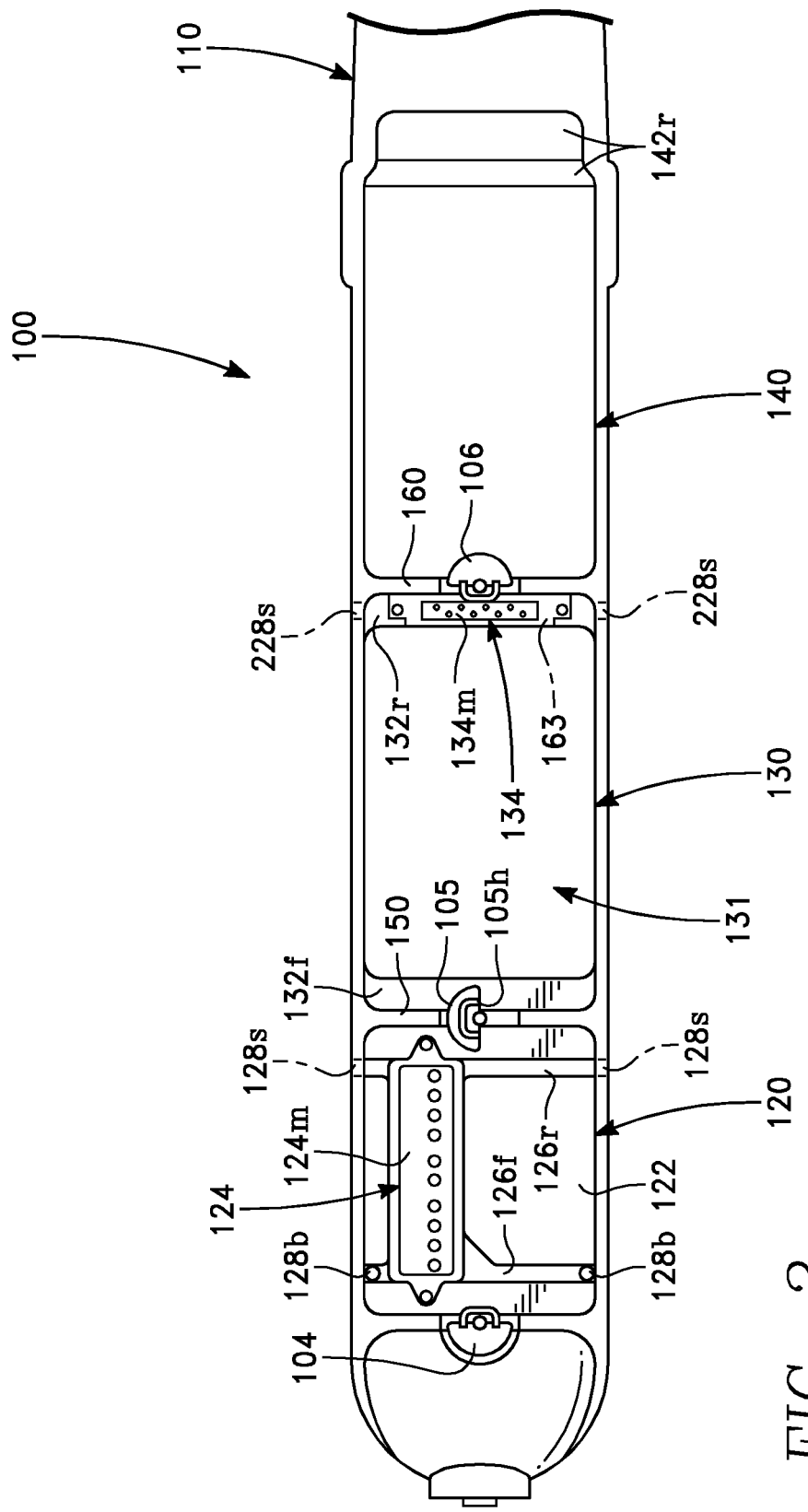
FIG. 2 shows a simplified top view of the fuselage of the amphibious unmanned aerial vehicle of FIG. 1.

FIG. 2 shows a simplified top view of the fuselage 100 of the amphibious unmanned aerial vehicle 10 of FIG. 1. The walls 110 of the fuselage 100 are composed of a buoyant material so that the fuselage 100 will float without wings (not shown) attached when the fuselage is fully loaded with components, such as the battery 20, the payload 30, and the avionics electronics 40, shown in FIG. 1, and other aircraft parts and components. For example, the walls 110 may have a molded foam core sealed with a waterproof skin, though this is not required. The walls 110 may be a single continuous wall or multiple wall sections, or the like.

In this embodiment, the fuselage is separated into three compartments, a forward battery compartment 120, a central payload compartment 130, and a rear avionics compartment 140. The forward battery compartment 120 is separated from the central payload compartment 130 by separator wall 150. The central payload compartment 130 is separated from the rear avionics compartment 140 by separator wall 160. In the embodiment shown, tabs 104, 105, and 106 are employed as a means to secure the components (not shown) in the compartments 120, 130, and 140. The tab 105 may be rotated by hand using the pivotable handle 105h to allow installation of a battery (not shown) and then rotated back to the position shown to lock the battery in the forward battery compartment 120. Other securing mechanisms may be used instead or in addition to the rotatable tabs 104, 105, and 106.

The battery compartment 120 has mounting surfaces 122 which support a battery (not show). In this embodiment, a connector 124, which may be a surface mount connector or the like, is generally flush with the mounting surfaces 122. Channels 126f and 126r are recessed below the mounting surfaces 122. Drainage openings such as weep holes 128b in the channel 126f extend through the bottom wall 110b of the fuselage 100. Weep holes 128s (shown in FIGS. 1-3) in the channel 126r extend through the side wall 110s of the fuselage 100.

The mating surface 124m of the connector 124 is located above the channels 126f and 126r so that the mating surface is not submerged in water when the battery 20 (FIG. 1) is connected/disconnected, if the fuselage is out of the water. Wiring 123f and 123b may be routed in the channels 126f and 126b, respectively, and recessed and/or embedded through the fuselage 100 to provide power to the motor (not show) and avionics electronics module 40 and/or a payload module 30.

The central payload compartment 130 has front and rear mounting surfaces 132f and 132r which support a payload, such as a camera assembly (not shown). The payload module 30 may contain the imaging, sensing, or other passive, active, non-lethal, or lethal payload devices. In this embodiment, a connector 134, which may be a surface mount connector or the like, is generally flush with the mounting surface 132r. The mounting surface 132r may form an enclosure 163 to contain the connector 134 and associated wiring. The enclosure may form a lower part of the separator wall 160. Weep holes 228s (shown in FIGS. 1-3) may extend from inside the enclosure 163 through the side wall 110s to allow water to exit the enclosure 163. In this embodiment, the central compartment 130 has a large opening 131 in the bottom so that a camera can be utilized, such as by viewing downward or by lowering it into the airstream through the large opening 131. The large opening 131 also allows drainage of fluid from the central compartment 130.

In various embodiments, the mating surface 134m of the connector 134 may be located high above the opening 131, on the top of the enclosure 163, so that the mating surface is not submerged in water when the payload 30 (FIG. 1) is connected/disconnected, even if the fuselage is not completely out of the water.

The rear avionics compartment 140 has a mounting surface 142 in a bottom of the avionics compartment 140. The mounting surface 142 has a forward channel 146f and a rear channel 146r. Channels 146f and 146r are recessed below the mounting surface 142. Drainage openings such as weep hole 228s (shown in FIGS. 1-3) in channel 146f extends through the side wall 110s of the fuselage 100. Weep holes 228b (shown in FIGS. 2 and 3) in the channel 146r extend through the bottom wall 110b of the fuselage 100. A sloping recess 229 in the mounting surface 142 drains water off the mounting surface 142 and into the channel 146r.

Figure 3:
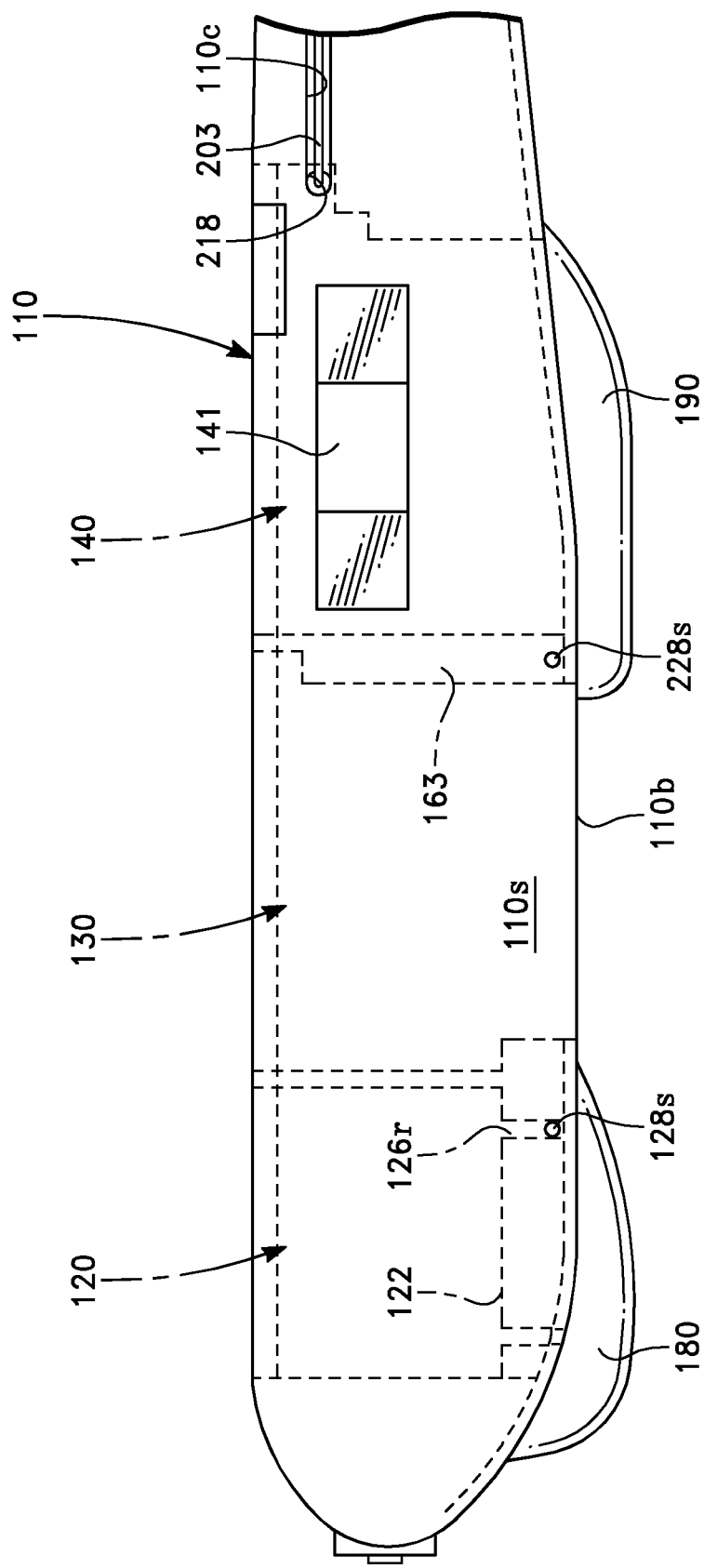
FIG. 3 shows a simplified side view of the fuselage of an amphibious unmanned aerial vehicle of FIG. 1.

The embodiment shown in FIG. 3 has an opening 141 in the side wall 110s of fuselage 110, to expose a heat sink 41 (FIG. 1) and allow heat generated by the avionics electronics 40 (FIG. 1) to be released.

FIG. 3 shows a simplified side view of the fuselage 100 of an amphibious unmanned aerial vehicle 10 of FIG. 1. In this embodiment, optional skid pads 180 and 190 are secured to the bottom wall 110b of the fuselage 100. The skid pads 180 and 190 are used in this embodiment for landing on hard surfaces. The skid pad 180 may be located directly below the forward compartment 120 and may be fabricated of a durable shock absorbing material of sufficient thickness and density to further protect from impact the component within the compartment 120, such as the battery 20 (FIG. 1). Similarly, the skid pad 190 may be located directly below the rear compartment 140, and may be fabricated of a durable shock absorbing material of sufficient thickness and density to further protect from impact a component within the compartment 140, such as the avionics electronics 40 (FIG. 1).

Weep holes 128s extend through the side wall 110s of the fuselage 100. The weep hole 128s extends through the side wall 110s and into rear channel 126r of the battery compartment 120. The weep hole 228s extends through the side wall 110s and into the enclosure 163 of the central payload compartment 130.

The fluid drainage openings may be weep holes, fluid drainage ports, or the like.

Various embodiments provide a fuselage 100 for a UAV which can land both on water and rugged terrain. Instead of sealing the entire aircraft from water intrusion, various embodiments achieve the ability to land on water by having just the individual electrical and electronic components, i.e. battery, payload, avionics electronics, and associated connectors and wiring, hermetically sealed.

This allows the rest of the aircraft to remain buoyant and any water in the aircraft draining by a set of fluid drain ports when the UAV is retrieved from the water. In this manner, the protection of the electrical and electronic components is not dependant on maintaining the integrity of the fuselage 100 or the exterior walls 110, which is likely to be damaged during landings on hard and/or rugged surfaces (typical of land landings).

This also allows the volume within the aircraft that needs to be waterproof to be minimized, thus reducing weight and overall system complexity.

Further, the aircraft's ability to land on hard surfaces or rugged terrain without damage to the electrical and electronic components is achieved not just by having these components encased in modularized compartments 120, 130, and 140, but also by allowing the walls 110 of the compartments 120, 130, and 140 to be partially compromised without necessarily causing failure of the UAV. The walls 110 create an impact zone around the electrical and electronic components within the compartments 120, 130, and 140, and the separators inhibit the components 20, 30, and 40 from impacting each other. Optionally, in some embodiments, the walls 110 and mounts 122, 132$f$, 132$r$, and 142 are such that the components 20, 30, and 40 (FIG. 1) are recessed from the walls 110 and/or their respective separators 150 and 160 (FIG. 2). Additional shock absorbing material (not shown) may be added within the compartments 120, 130, or 140 to further reduce any chance of damage to the components 20, 30, or 40 from impacts.

As illustrated in FIGS. 1 and 2, the fuselage 110 may contain an optional exterior channel 110$c$ in the side 110$s$ of the fuselage 110, extending rearward from a hole 218 in the side wall 110$s$ at the avionics compartment 140, to the tail section of the aircraft 10. Wiring 203 extends through the hole 218 and along the exterior channel 110$c$ to connect the avionics component 40 to an actuator assembly 202 for actuating the control surfaces in the tail of the aircraft 10. The exterior channel 110$c$ allows the wiring to be easily accessed for inspection, repair, and replacement.

Retractable Camera Assembly

FIGS. 4-7

Figure 4:
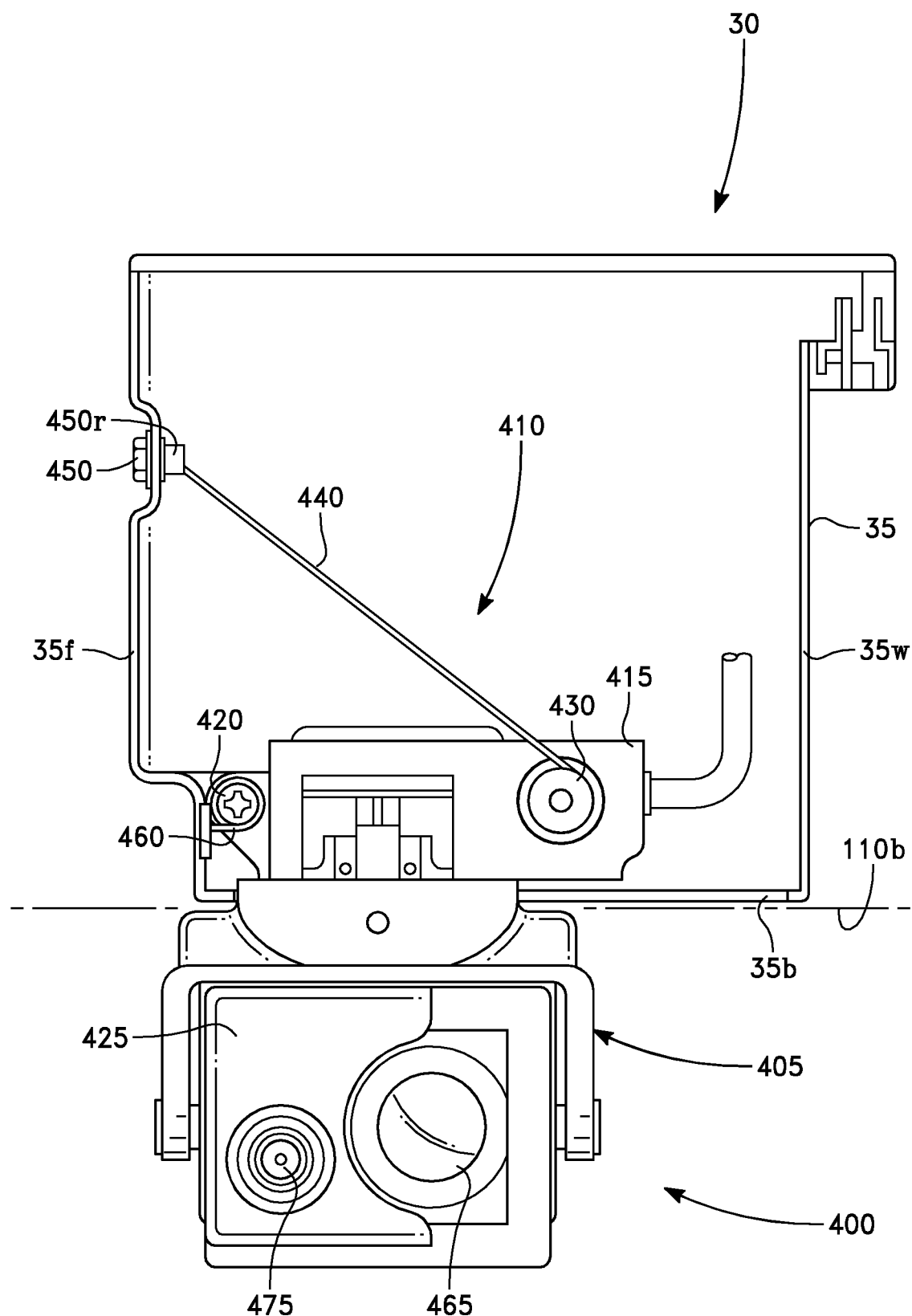
FIG. 4 shows a simplified cut away side view of one embodiment of a payload module.
Figure 5:
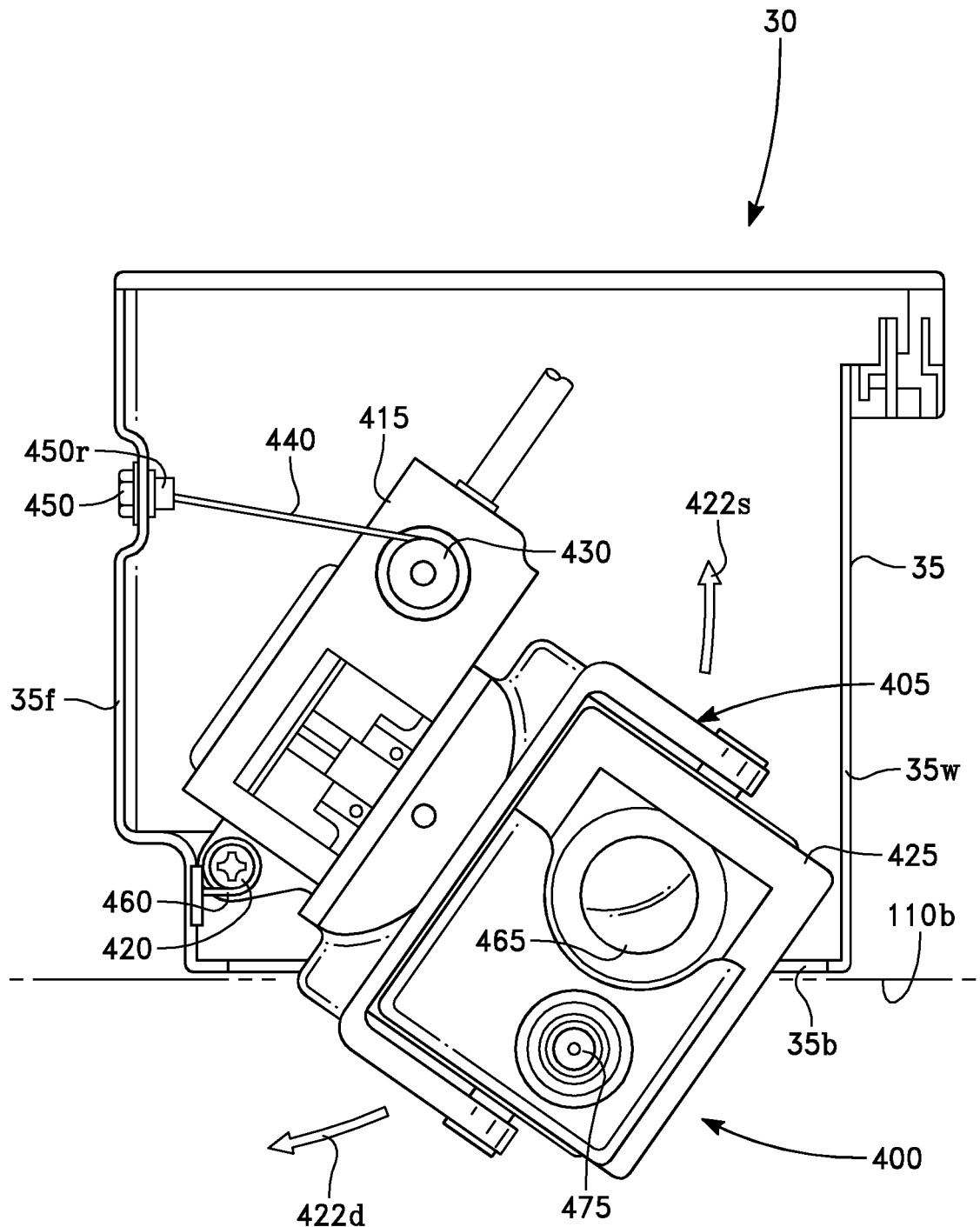
FIG. 5 shows a simplified cut away side view of one embodiment of a payload module of FIG. 4, with the payload partially retracted into the housing.
Figure 6:
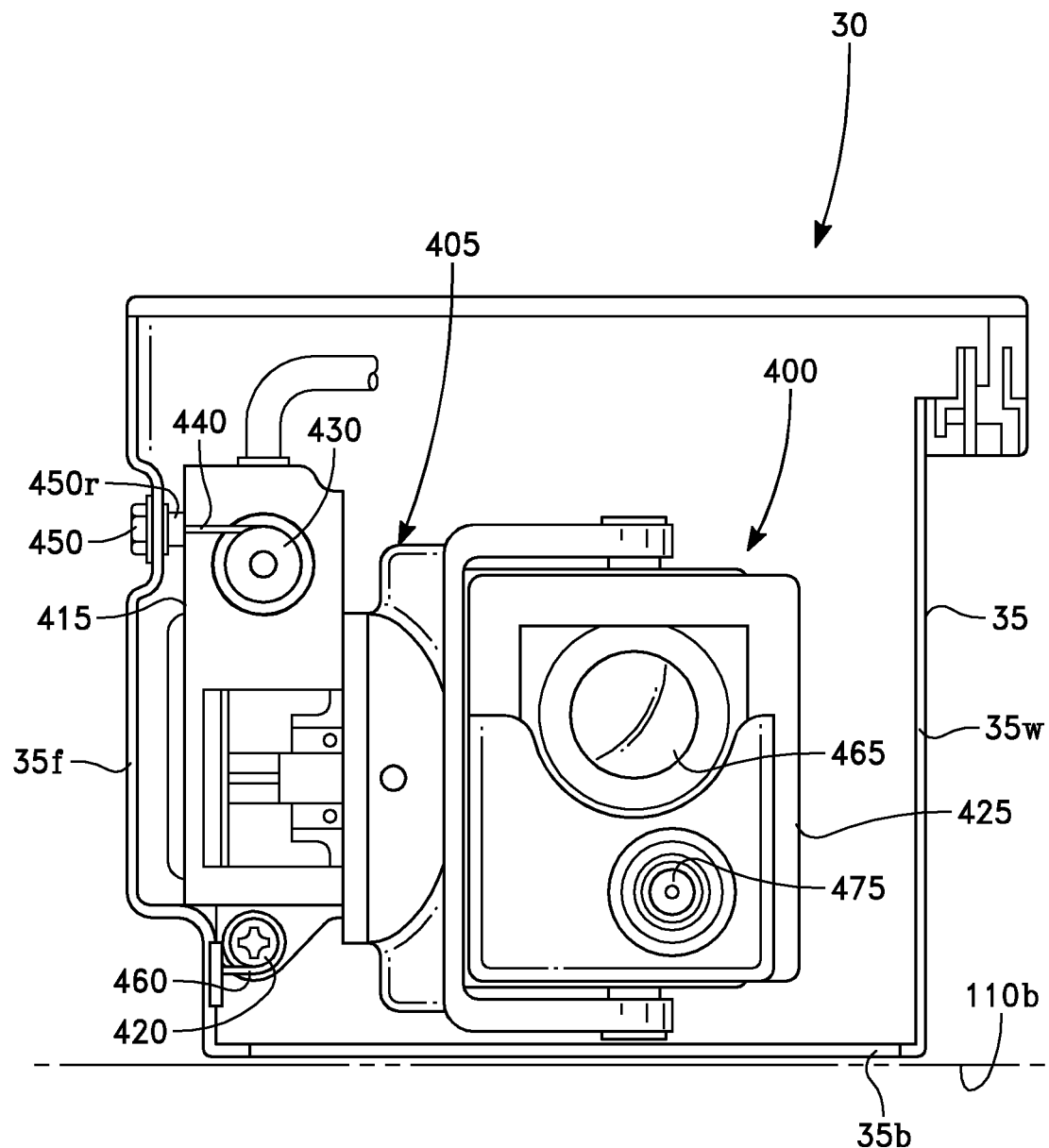
FIG. 6 shows a simplified cut away side view of one embodiment of a payload module of FIG. 4, with the payload fully retracted into the housing.

FIG. 4 shows a simplified cut away side view of one embodiment of a payload module 30. Referring to FIGS. 1, 3 and 4-7, a retraction mechanism 410 is provided for a payload 400 for moving the payload 400 from a stowed position (shown in FIG. 6) within the UAV 10 to a position extended out of the payload module 30 as shown in FIG. 4, and thus from the bottom 110$b$ of the fuselage 100 of the UAV 10. FIG. 5 shows a simplified cut away side view of one embodiment of a payload module 30 of FIG. 4, with the payload 400 partially retracted into the housing 35 and FIG. 6 shows a simplified cut away side view of one embodiment of a payload module 30 of FIG. 4, with the payload fully retracted into the housing 35.

The payload 400 may be a gimbaled pan and tilt camera assembly 405 as shown, which, when in the extended position can view about and below the UAV 10. During retraction or extension of the camera assembly 405, the camera assembly 405 moves about a single pivot point/axis or hinge 420. The camera assembly 405 moves as shown by the arrows 422$d$ in the direction of deployment outside of the housing 35, and 422$s$ in the direction to stow the payload 400 within the housing 35. In other embodiments, the hinge 420 may have multiple pivot points with multiple pivot axes (not shown).

Generally, opposite of this hinge 420 on the camera assembly 405 is a winch 430. The winch 430 is in turn connected by a cable 440 at, to, or with a wall 35$w$ of the housing 35, either directly or indirectly, such as with a fastener 450, or other securing means to the forward wall 35$f$, so that the camera assembly 405 can be fully retracted within the housing 35 of the module 30 by operation of the winch 430. The winch 430 is located in the pan tray 415.

A biasing member, such as a spring 460, at or about the hinge 420 is used to bias the payload 400 down to its extended position (shown in FIG. 4). Stops, rests, or limiters (not shown) associated with the camera assembly 405 and/or the housing 35 may be utilized limit motion of the camera assembly in its extended position. In some embodiments, the cable 440 may by itself, or in addition to other limiters, limit the motion of the camera assembly 405 in its extended position and thus may be in tension when the camera is fully extended. Further, in some embodiments, the spring 460 provides enough force to keep the camera assembly 405 stable when extended into the airstream. In other embodiments, an actuatable locking mechanism (not shown), may be used secure the camera assembly when extended, if desired.

The payload 400 may be situated in the UAV 10 so rotation of the camera assembly 405 about the hinge 420 into the housing occurs along the direction of the travel of the UAV 10. In the event of a failure of the retraction mechanism 410, this configuration allows the camera assembly 405 to retract back into the UAV 10 as it contacts the ground upon landing, thereby reducing the probability, or severity of damage to the payload 400. To facilitate this, the hinge 420, or other pivot means, is located forward and near the bottom of the housing 35. Thus, the hinge 420 may be located on the forward wall 35$f$ of the housing 35, so that the axis of the hinge pivot shaft 795 (FIG. 7) is orthogonal to the direction of motion of the UAV 10.

The use of the cable 440 further provides for robust operation and environmental survivability, as well as a reduction in weight. The term cable as referred to herein includes braided cable, ribbon cable, a belt, a strap, a rope, a chain, or other flexible means to support tension or strain. In one embodiment, the cable 440 may be a NYLON, KEVLAR, or other material belt that is reliable, lightweight, and not susceptible to corrosion.

In the embodiment, the fastener 450 may also function as a stop or rest 450$r$ for the camera assembly 405. In this embodiment, the pan tray 415 seats against the rest 450$r$ when the camera assembly is fully retracted as shown of FIG. 6. In other embodiments, the fastener 450 and the rest 450$r$ may be separate mechanisms.

Figure 7:
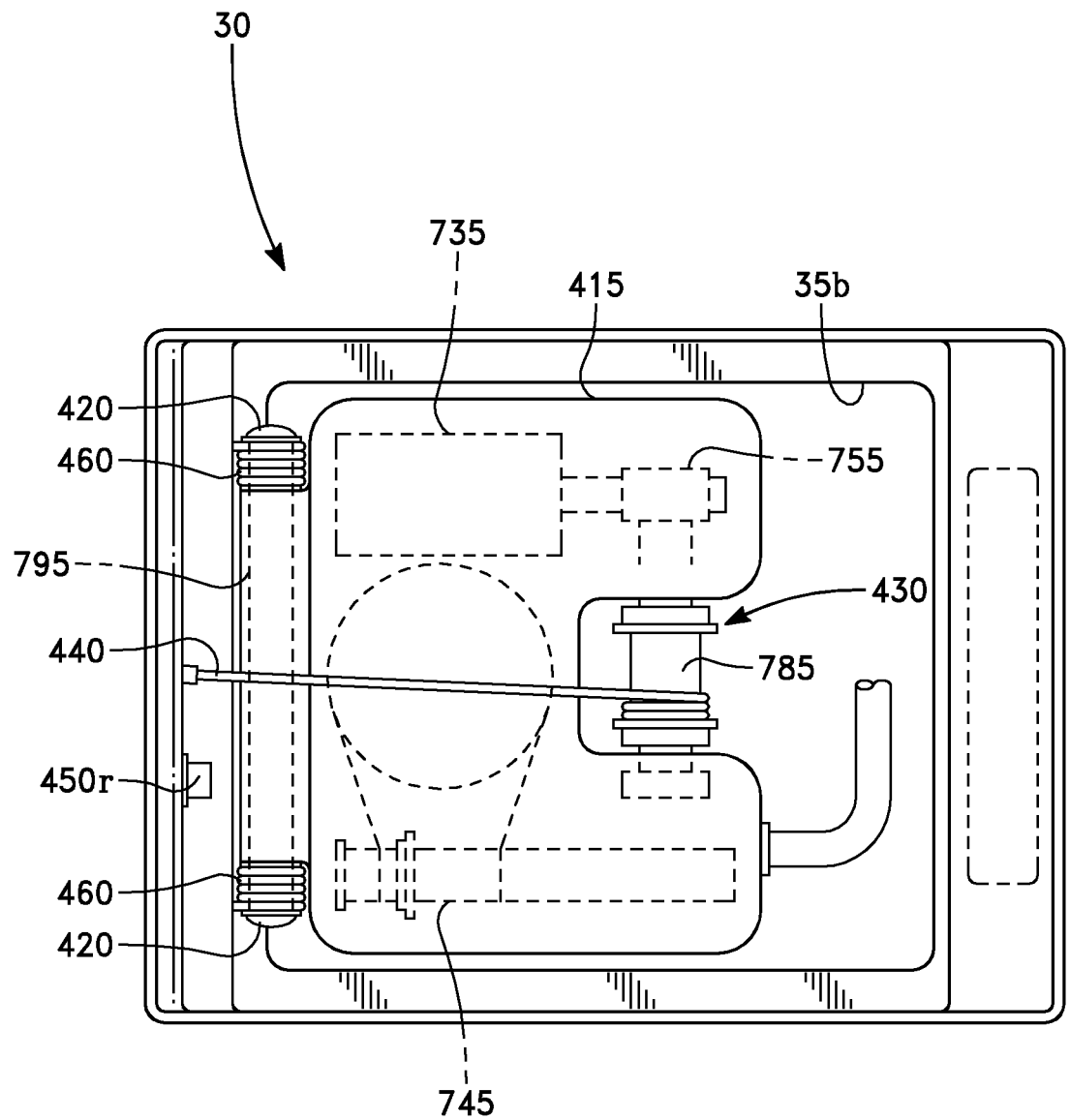
FIG. 7 shows a simplified cut away top view of one embodiment of the pan tray of the camera assembly.

FIG. 7 shows a simplified cut away top view of one embodiment of the pan tray 415 of the camera assembly 405. The pan tray 415 houses the pan motor assembly 745, which is used to pan the camera assembly 405. The winch motor 735 is also housed within the pan tray 415 and is coupled via worm gears 755, also housed in the pan tray 415, to the winch drum 785. The winch drum 785 is external to the pan tray 415 and is located opposite the pivot shaft 795.

In this embodiment, the bottom 35b of the housing 35 is not sealed so the payload module 30 has an open bottom 35b to facilitate deployment of the payload 400. Thus, in this embodiment the pan tray 415, as well as the tilt cylinder 425 are individually sealed. The tilt cylinder 725 typically houses the tilt motor assembly (not show) and the imaging, sensing, or other passive, active, non-lethal, or lethal payload devices 465 and 475.

It is worthy to note that any reference to "one embodiment" or "an embodiment" means that a particular feature, structure, or characteristic described in connection with the embodiment may be included in an embodiment, if desired. The appearances of the phrase "in one embodiment" in various places in the specification are not necessarily all referring to the same embodiment.

The illustrations and examples provided herein are for explanatory purposes and are not intended to limit the scope of the appended claims. This disclosure is to be considered an exemplification of the principles of the invention and is not intended to limit the spirit and scope of the invention and/or claims of the embodiment illustrated.

Those skilled in the art will make modifications to the invention for particular applications of the invention.

The discussion included in this patent is intended to serve as a basic description. The reader should be aware that the specific discussion may not explicitly describe all embodiments possible and alternatives are implicit. Also, this discussion may not fully explain the generic nature of the invention and may not explicitly show how each feature or element can actually be representative or equivalent elements. Again, these are implicitly included in this disclosure. Where the invention is described in device-oriented terminology, each element of the device implicitly performs a function. It should also be understood that a variety of changes may be made without departing from the essence of the invention. Such changes are also implicitly included in the description. These changes still fall within the scope of this invention.

Further, each of the various elements of the invention and claims may also be achieved in a variety of manners. This disclosure should be understood to encompass each such variation, be it a variation of any apparatus embodiment, a method embodiment, or even merely a variation of any element of these. Particularly, it should be understood that as the disclosure relates to elements of the invention, the words for each element may be expressed by equivalent apparatus terms even if only the function or result is the same. Such equivalent, broader, or even more generic terms should be considered to be encompassed in the description of each element or action. Such terms can be substituted where desired to make explicit the implicitly broad coverage to which this invention is entitled. It should be understood that all actions may be expressed as a means for taking that action or as an element which causes that action. Similarly, each physical element disclosed should be understood to encompass a disclosure of the action which that physical element facilitates. Such changes and alternative terms are to be understood to be explicitly included in the description.

Having described this invention in connection with a number of embodiments, modification will now certainly suggest itself to those skilled in the art. The example embodiments herein are not intended to be limiting, various configurations and combinations of features are possible. As such, the invention is not limited to the disclosed embodiments, except as required by the appended claims.

What is claimed is:

1. A method in a UAV comprising:
   a) applying a biasing force to a payload to bias a payload out of the UAV;
   b) retaining the payload within the UAV using a flexible retraction mechanism;
   c) extending the payload from the UAV using the flexible retraction mechanism; and
   d) retracting the payload using a flexible retraction mechanism so as to cause the payload to retract into the UAV from the deployed position while biasing the payload out of the UAV.

2. The method of claim 1, wherein extending the payload comprises extending the payload from the fuselage.

3. The method of claim 2 further comprising:
   a) launching the UAV;
   b) landing the UAV without using landing gear; and
   c) wherein extending the payload comprises extending the payload after launching and before landing the UAV.

4. The method of claim 1 further comprising:
   a) launching the UAV and extending the payload from the UAV; and
   b) landing the UAV without using landing gear.

5. The method of claim 4, wherein landing the UAV comprises landing the UAV on water.

6. The method of claim 4, wherein landing the UAV comprises landing the UAV on land.

7. The method of claim 4, wherein launching the UAV comprises launching the UAV by hand.

8. The method of claim 4, wherein landing comprises using a skid pad.

9. The method of claim 1 further comprising:
   a) launching the UAV by hand; and
   b) landing the UAV on water.

10. The method of claim 1 further comprising:
    a) launching the UAV by hand; and
    b) landing the UAV on land.

* * * * *